US007788265B2

(12) United States Patent  (10) Patent No.: US 7,788,265 B2
Morscher et al.  (45) Date of Patent: Aug. 31, 2010

(54) TAXONOMY-BASED OBJECT CLASSIFICATION

(75) Inventors: Thomas Morscher, Kichberg (CH); Wolfgang Löffler, Basel (CH)

(73) Assignee: finebrain.com AG, Basel (CH)

( * ) Notice: Subject to any disclaimer, the term of this patent is extended or adjusted under 35 U.S.C. 154(b) by 838 days.

(21) Appl. No.: 11/614,722

(22) Filed: Dec. 21, 2006

(65) Prior Publication Data

US 2008/0154875 A1  Jun. 26, 2008

(51) Int. Cl.
*G06F 17/30* (2006.01)
(52) U.S. Cl. ............................... 707/740; 707/956
(58) Field of Classification Search .................. None
See application file for complete search history.

(56) References Cited

U.S. PATENT DOCUMENTS

| | | | |
|---|---|---|---|
| 5,251,131 A | 10/1993 | Masand et al. | |
| 6,055,540 A * | 4/2000 | Snow et al. | 707/103 R |
| 6,185,550 B1 * | 2/2001 | Snow et al. | 707/1 |
| 6,640,224 B1 | 10/2003 | Chakrabarti | |
| 6,697,799 B1 | 2/2004 | Neal et al. | |
| 7,043,492 B1 | 5/2006 | Neal et al. | |
| 7,058,622 B1 * | 6/2006 | Tedesco | 707/2 |
| 7,275,052 B2 * | 9/2007 | Peh | 707/2 |
| 2002/0087515 A1 * | 7/2002 | Swannack et al. | 707/2 |
| 2003/0018626 A1 | 1/2003 | Kay et al. | |
| 2003/0059106 A1 * | 3/2003 | Gutta | 382/158 |
| 2003/0120662 A1 | 6/2003 | Vishik | |
| 2005/0216448 A1 | 9/2005 | Talib et al. | |
| 2005/0228774 A1 | 10/2005 | Ronnewinkel | |
| 2006/0031214 A1 * | 2/2006 | Solaro et al. | 707/4 |
| 2006/0041604 A1 | 2/2006 | Peh | |
| 2006/0095521 A1 | 5/2006 | Patinkin | |
| 2006/0143254 A1 | 6/2006 | Chen et al. | |
| 2006/0288023 A1 * | 12/2006 | Szabo | 707/100 |
| 2007/0106662 A1 * | 5/2007 | Kimbrough et al. | 707/5 |

OTHER PUBLICATIONS

Adami et al., Bootstrapping . . . , Conf. on Info. & Know. Mgmt. 03, Nov. 3-8, 2003, New Orleans, Louisiana, USA, Copyright 2003 Assoc. Comp. Machinery, 1-58113-723-0/03/0011.

* cited by examiner

*Primary Examiner*—Neveen Abel Jalil
*Assistant Examiner*—Kevin Young
(74) *Attorney, Agent, or Firm*—Robert Plotkin, P.C.

(57) ABSTRACT

Objects, such as documents, are classified according to a taxonomy. The taxonomy includes nodes, corresponding to object classes, arranged in a hierarchy. Class keywords are associated with the nodes. Search strings are formed for the classes by traversing the taxonomic branches and concatenating the keywords associated with the classes. For each object to be classified, a search engine is used to perform searches on the object using the search strings. The searches produce search scores for each search string. Each object is classified by identifying the class(es) corresponding to the highest search score(s) for the object, and classifying the object into the identified class(es).

21 Claims, 11 Drawing Sheets

TAXONOMY-BASED OBJECT CLASSIFICATION

BACKGROUND

Anyone who has searched for information on the World Wide Web using search sites, such as Google or Yahoo!, is familiar with the process of searching for information in at least one of two ways: by providing a textual query to the search engine describing the information sought (e.g., "Siamese cats"), and by browsing through a hierarchical list of categories provided by the site. For example, in the latter case one might select the category "Animals," followed by "Mammals," "Felines," and "Domestic Cats" to arrive at a list of documents about Siamese cats available on the World Wide Web.

The hierarchical list of categories provided by a search site is one example of a taxonomy. More generally, a taxonomy is a tree structure of hierarchically ordered categories used to classify objects and/or data. Taxonomies are often used to aid and facilitate the systematic retrieval of relevant information out of large amounts of stored data, as the example of the Internet search engine demonstrates.

For a taxonomy to be useful for these purposes, the data must first be classified according to taxonomy by associating each datum (e.g., document) with one or more nodes in the taxonomy. For example, documents that relate to Siamese cats must be tagged in some way as being associated with the "Domestic Cats" node in the taxonomy if the taxonomy-browsing technique described above is to successfully retrieve web pages relating to Siamese cats.

Classifying data according to a taxonomy is a difficult problem, particularly if a large amount of data mast be classified. Even classifying a single document may be tedious, time-consuming, and error prone due to the need to: (1) analyze the content of the document, (2) identify any relationships between the document content and the classes defined by nodes in the taxonomy, and (3) identify one or more such nodes with which to associate the document. In many environments, such as corporate or academic intranets, it may be necessary or desirable to perform such classification on millions of documents, to re-classify documents as they change, and to continually classify new documents as they are added to the system. It is particularly desirable to perform such classification as efficiently, reliably, and automatically as possible.

SUMMARY

Objects, such as documents, are classified according to a taxonomy. The taxonomy includes nodes, corresponding to object classes, arranged in a hierarchy. Class keywords are associated with the nodes. Search strings are formed for the classes by traversing the taxonomic branches and concatenating the keywords associated with the classes. For each object to be classified, a search engine is used to perform searches on the object using the search strings. The searches produce search scores for each search string. Each object is classified by identifying the class(es) corresponding to the highest search score(s) for the object, and classifying the object into the identified class(es).

For example, in one embodiment of the present invention, a computer-implemented method is provided for classifying an object in a taxonomy. The taxonomy includes a plurality of nodes associated with a plurality of classes. The method includes: (A) identifying a plurality of search strings based on a plurality of class keywords associated with the plurality of nodes; (B) using a search engine to perform a plurality of searches on the object using the plurality of search strings to produce a plurality of search scores corresponding to the plurality of search strings; (C) identifying one of the plurality of nodes based on the plurality of search scores; and (D) classifying the object in a class associated with the identified node.

Another embodiment of the present invention is directed to a computer-implemented method including: (A) identifying a class in a taxonomy; (B) identifying a plurality of search strings based on a plurality of class keywords associated with the class; (C) using a search engine to perform a plurality of searches on a plurality of objects using the plurality of search strings to produce a plurality of search scores corresponding to the plurality of search strings; (D) identifying a plurality of aggregate search scores corresponding to the plurality of search strings; (E) identifying one of the plurality of search strings having a maximum one of the plurality of aggregate search scores; (F) identifying one of the plurality of class keywords corresponding to the identified one of the plurality of search strings; and (G) selecting the identified one of the plurality of class keywords as a label for the class.

Yet another embodiment of the present invention is directed to a computer-implemented method including: (A) identifying a first plurality of documents associated with a user; (B) identifying a plurality of search strings based on a plurality of class keywords associated with a plurality of nodes in a taxonomy, the plurality of nodes being associated with a first plurality of classes; (C) identifying a second plurality of classes, in the taxonomy, associated with the first plurality of documents by performing a plurality of searches on the first plurality of documents using the identified plurality of search strings; and (D) associating the second plurality of classes with the user.

Still a further embodiment of the present invention is directed to a computer-implemented method including: (A) identifying a first plurality of classes, in a taxonomy, associated with a first plurality of documents; (B) identifying a second plurality of classes, in the taxonomy, associated with a user; (C) identifying a subset of the first plurality of documents based on a comparison between the first plurality of classes and the second plurality of classes; and (D) associating the subset of the first plurality of documents with the user.

Another embodiment of the present invention is directed to a computer-implemented method including: (A) identifying a first plurality of classes, in a taxonomy, associated with a plurality of documents; (B) modifying a plurality of class keywords associated with a second plurality of classes in the taxonomy; (C) using a search engine to perform a plurality of searches on the plurality of documents using a plurality of search strings based on the modified plurality of class keywords to produce a plurality of search scores corresponding to the plurality of search strings; (D) identifying a subset of the modified plurality of class keywords based on the plurality of search scores; and (E) modifying the taxonomy in accordance with the identified subset of the modified plurality of class keywords.

Still another embodiment of the present invention is directed to a computer-implemented method including: (A) identifying a plurality of search strings based on a plurality of class keywords associated with a plurality of nodes in a taxonomy, the plurality of nodes corresponding to a plurality of classes, each of the plurality of search strings corresponding to a distinct one of the plurality of classes; (B) using a search engine to perform a plurality of searches on a plurality of documents using the plurality of search strings to identify a plurality of subsets of the plurality of documents, the plurality of subsets corresponding to the plurality of search strings; and (C) associating each of the plurality of subsets of the plurality of documents with the class corresponding to the search string which resulted in identifying the subset.

Other features and advantages of various aspects and embodiments of the present invention will become apparent from the following description and from the claims.

DETAILED DESCRIPTION

Figure 1A:
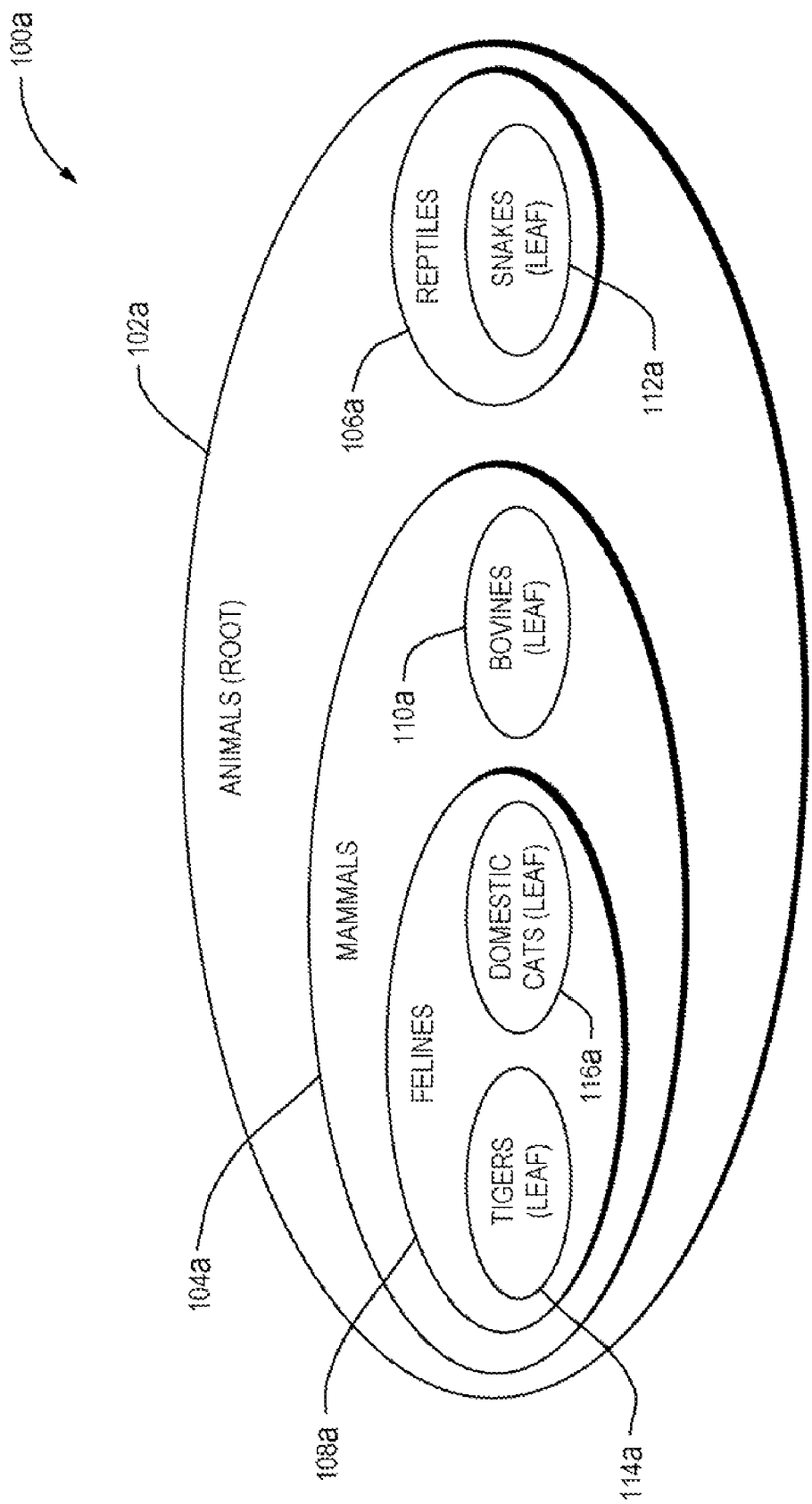
FIGS. 1A-1B are diagrams of a taxonomy according to one embodiment of the present invention.
Figure 1B:
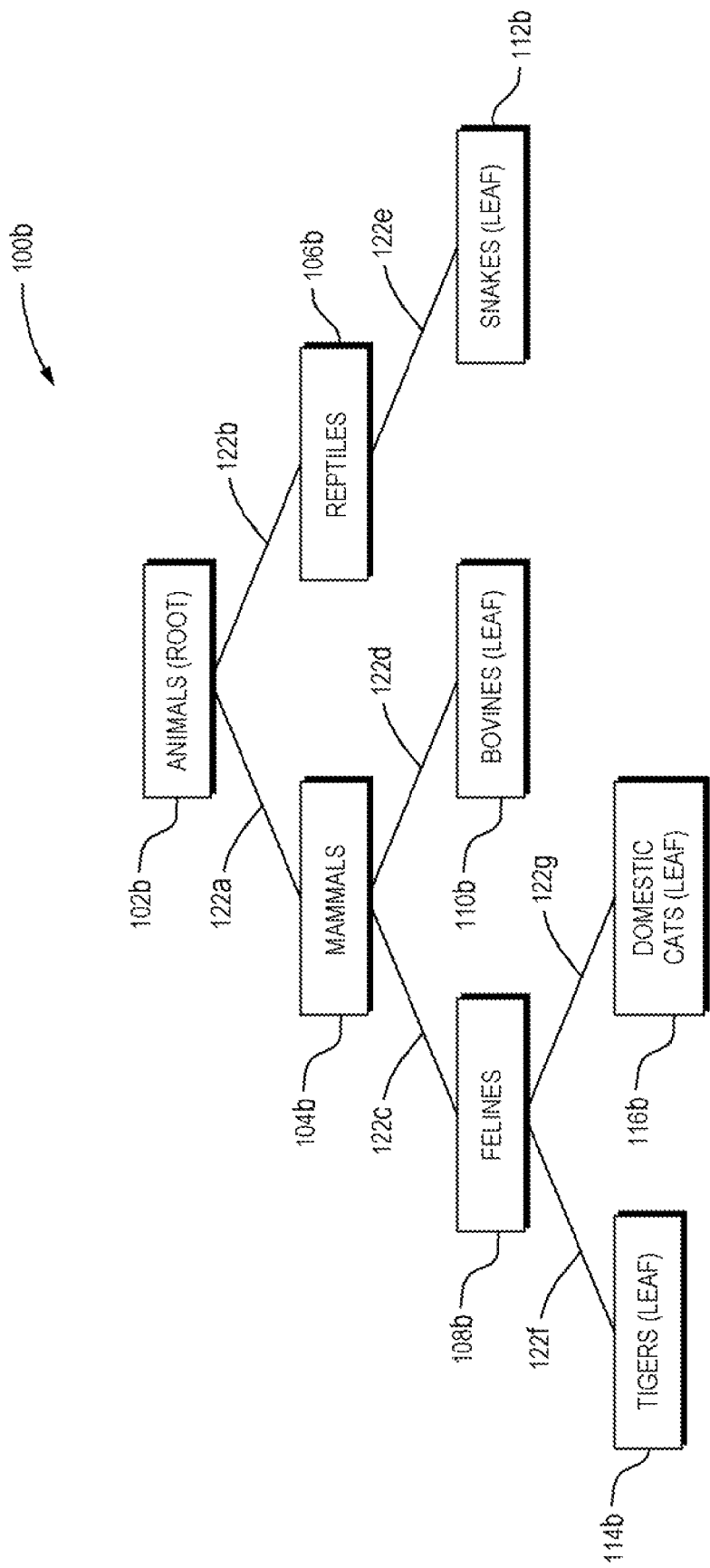

Embodiments of the present invention are directed to techniques for classifying objects (such as documents) in a taxonomy. Referring to FIGS. 1A-1B, a diagram of an example taxonomy 100 is shown for purposes of illustration. FIG. 1A shows a first view 100a of the taxonomy 100 in which nodes are illustrated as a hierarchy of subsets, while FIG. 1B shows a second view 100b of the taxonomy 100 in which nodes are illustrated in a tree structure. Reference numeral 100 will be used herein to refer to the taxonomy itself, while reference numerals 100a and 100b will be used to refer to the particular views shown in FIGS. 1A and 1B, respectively. Similarly, reference numerals 102, 104, 106, 108, 110, 112, 114, and 116 will be used herein to refer to nodes in the taxonomy 100, while the same numerals with the suffix "a" or "b" will be used to refer to the views of those nodes in FIG. 1A or 1B, respectively.

A taxonomy may be used to classify a set of objects. The term "object" is used generally herein to refer to anything that may be classified in a taxonomy, such as a physical item, data, or a process. For example, a document is an example of an "object" as that term is used herein.

Figure 2:
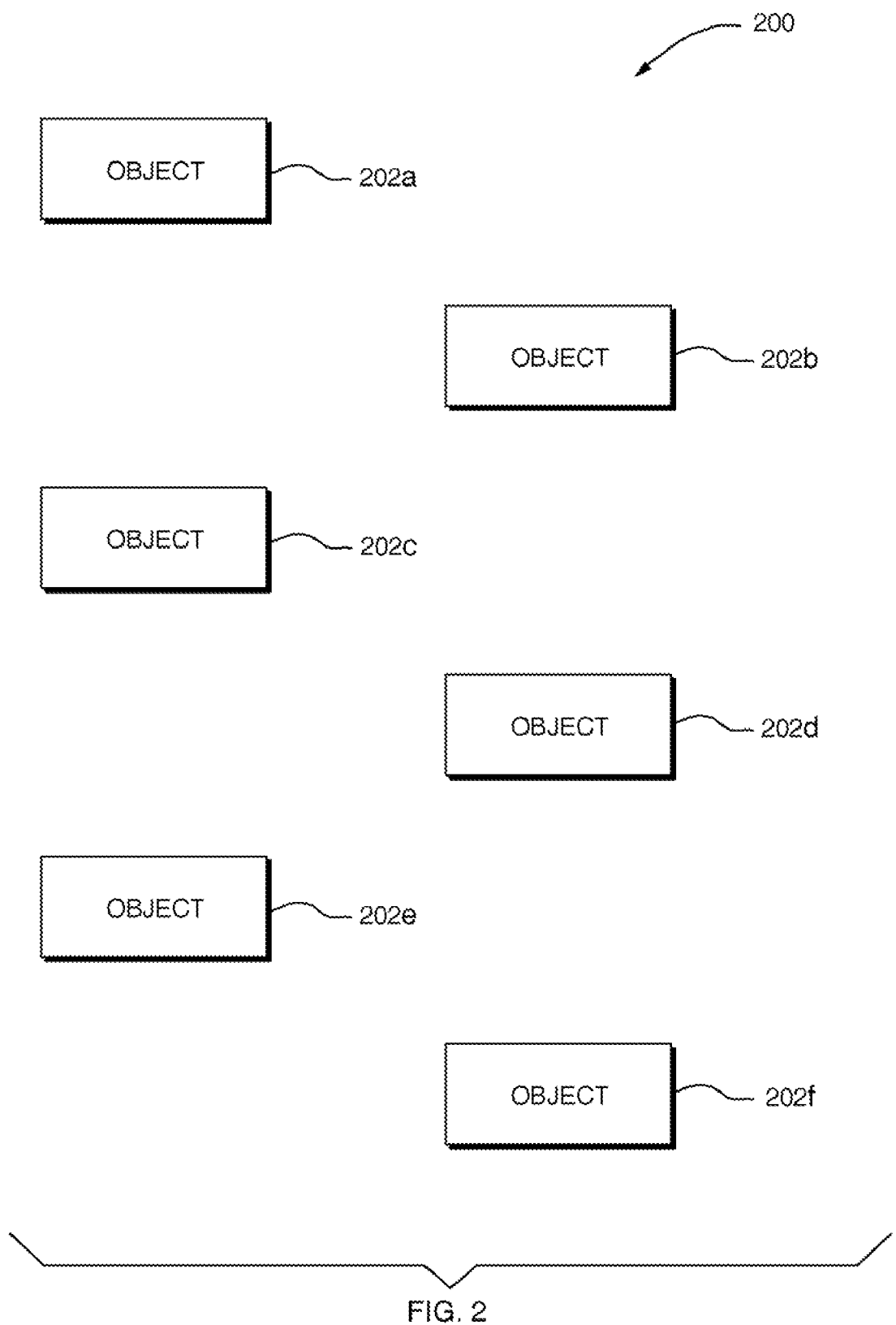
FIG. 2 is a diagram of a collection of objects according to one embodiment of the present invention.

Each node in a taxonomy may correspond to a class of objects. For example, FIG. 2 is an abstract illustration of a set 200 of objects 202a-f. Assume for purposes of the following discussion that the taxonomy 100 shown in FIG. 1 may be used to classify the objects 202a-f illustrated in FIG. 2. More specifically, each node in the taxonomy 100 may correspond to an object class, each of which may contain zero or more of the objects 202a-f illustrated in FIG. 2. An object is said to be "classified" in or by a taxonomy node if the object is a member of the class to which the taxonomy node corresponds.

In its simplest form, a taxonomy is a hierarchical structure of a set repeatedly divided into disjoint subsets. As shown in the view 100b of FIG. 1B, this kind of taxonomy may be visualised as an inverted tree structure with nodes (e.g., nodes 102b, 104b, 106b, 108b, 110b, 112b, 114b, and 116b) and connections (e.g., connections 122a-g) between them. The single set that contains all objects classified by the taxonomy is referred to as the "root class" and is represented by the root node that sits on top of the tree. For example, in the taxonomy 100 of FIG. 1, the root class is the class of animals, represented by root node 102.

The nodes below the root node 102 correspond to more specific classifications that apply to subsets of the total set of classified objects corresponding to the root node 102. In general, a node at a lower level corresponds to a more specific (narrower) classification than an ancestor of that node. For example, node 104 may correspond to a classification that is more specific than its parent node 102. The particular number and organization of nodes in the taxonomy of FIG. 1 is shown merely for purposes of example and does not constitute a limitation of the present invention.

Each subclass in a taxonomy is represented by a node that is directly connected to the node corresponding to its superclass. For example, in the taxonomy of FIG. 1, the subclass of "mammals" is represented by node 104, which is directly connected to the node 102 corresponding to its superclass (as illustrated by connection 122a in FIG. 1B).

A class that is no longer divided into subclasses itself is referred to as a "leaf class," and its corresponding node in the tree is referred to as a "leaf node." For example, in the taxonomy of FIG. 1, the leaf class of "tigers" is represented by leaf node 114.

Subdividing the root class sequentially into smaller and smaller subclasses may be visualised as traversing the corresponding tree along a so-called "branch" from the root node to a leaf node along a unique path, i.e., a sequence of nodes and connections between them. Consider, for example, subdividing the class of "Animals" into the class of "Mammals," which is in turn subdivided into the class of "Felines," which is in turn subdivided into the class of "Domestic cats." This may be visualized as traversing the tree 100b of FIG. 1B from the root node 102b ("animals") to the leaf node 116b ("Domestic cats") along the path consisting of connection 122a, node 104b ("Mammals"), connection 122c, node 108b ("Felines"), connection 122f, and node 116b ("Domestic cats").

The particular taxonomy 100 illustrated in FIG. 1 is shown merely for purposes of example. Any other taxonomy may be used in conjunction with embodiments of the present invention.

Thus far each node in the taxonomy 100 has been described as being associated with a particular class. The class with which a particular node is associated may be defined in any of a variety of ways. For example, each node in the taxonomy 100 may be associated with one or more terms, referred to herein as "class keywords," which serve as labels to define the class corresponding to the node.

For example, root node 102 may be associated with the class keyword "Animals," node 104 may be associated with the class keyword "Mammals," node 106 may be associated with the class keyword "Reptiles," node 108 may be associated with the class keyword "Felines," node 110 may be associated with the class keyword "Bovines," node 112 may be associated with the class keyword "Snakes," node 114 may be associated with the class keyword "Tigers," and node 116 may be associated with the class keyword "Domestic cats."

Although in the example just provided each node is associated with a single class keyword, this is not a requirement of the present invention. Rather, any node may be associated with any number of class keywords. For example, a set of equally-valid synonyms may be used as the keywords for a class. One such keyword for each class may be designated as a human-readable label for the class. The keywords for a class may be selected by, for example, selecting the label for the class and then deriving other keywords from the label. In the following discussion, assume for purposes of example that node 108 is associated with the class keywords "felines" and "cats," where "felines" is the class label.

Furthermore, a single "keyword" may include one or more words. In other words, a class keyword may be a word or a phrase. For example, in FIG. 1 the node 116 has the phrase "domestic cats" as a class keyword. The set of class keywords associated with the root node 102 may or may not be empty.

The class keywords for the taxonomy 100 may be selected in any manner. For example, the class keywords may be generated dynamically from the objects (e.g., objects 202a-f shown in FIG. 2) associated with the nodes in the taxonomy 100, stored statically, or a combination thereof. The keywords associated with each class may be ordered (i.e., for any given pair of keywords associated with a class, one may be preferred over the other) or unordered (i.e., for any given pair of keywords associated with a class, neither of the two keywords may be preferred over the other). For example, the keywords "felines" and "cats" for the class associated with node 108 may be ordered such that "felines" is preferred over (i.e., has a higher ranking than) "cats."

As stated above, objects may be classified in a taxonomy. For example, one or more of the objects 202a-f (FIG. 2) may be classified in the taxonomy 100 (FIG. 1). In other words, assuming the set 200 of objects 202a-f, each of the nodes in the taxonomy 100 may be associated with zero or more of the objects 202a-f in the set 200. If a particular object is associated with a particular node, then the object is said to be classified in the class associated with the node. Any object in the set 200 may be classified in zero or more classes.

Figure 3:
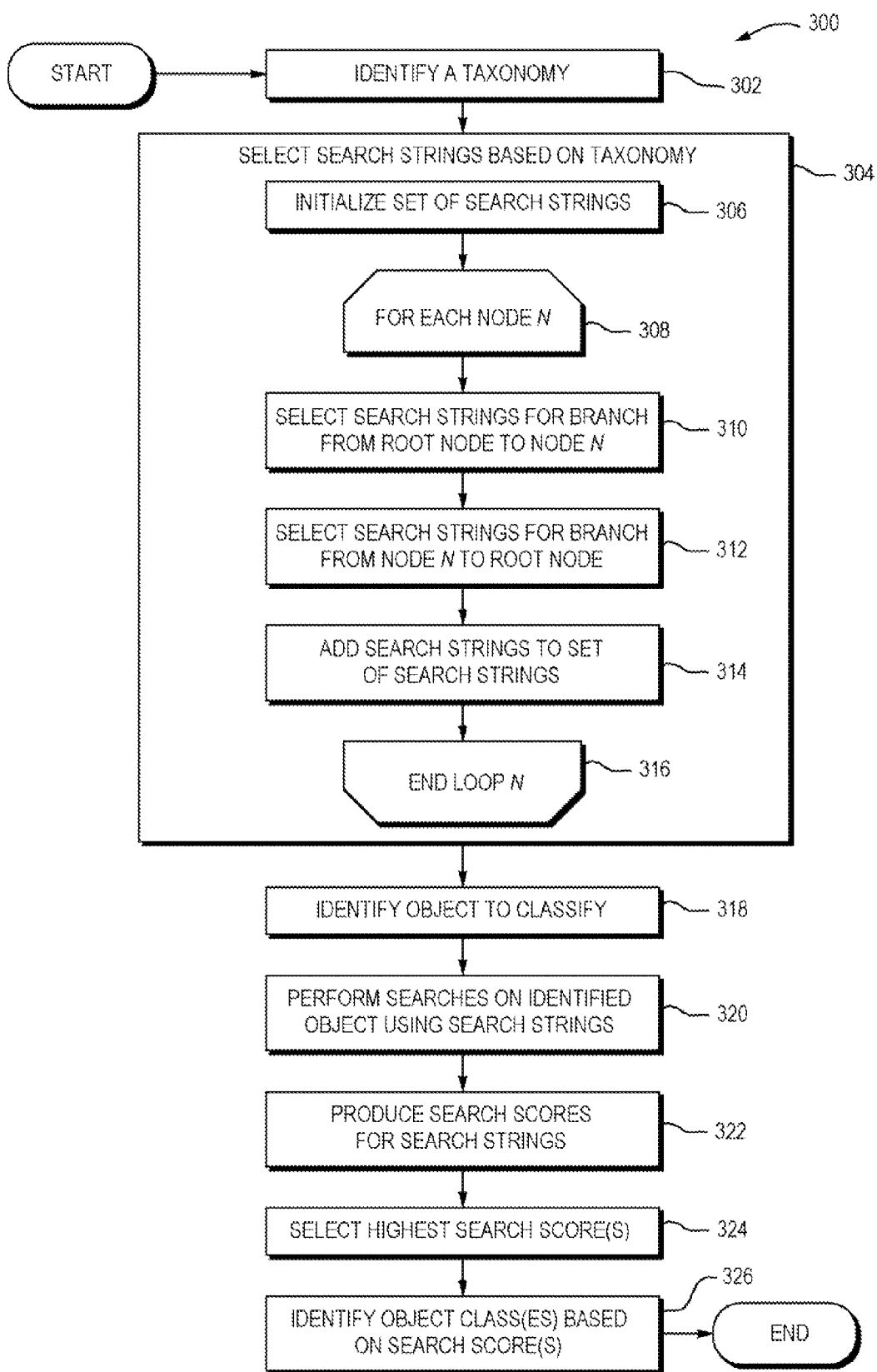
FIG. 3 is a flowchart of a method for classifying objects in a taxonomy according to one embodiment of the present invention.
Figure 4:
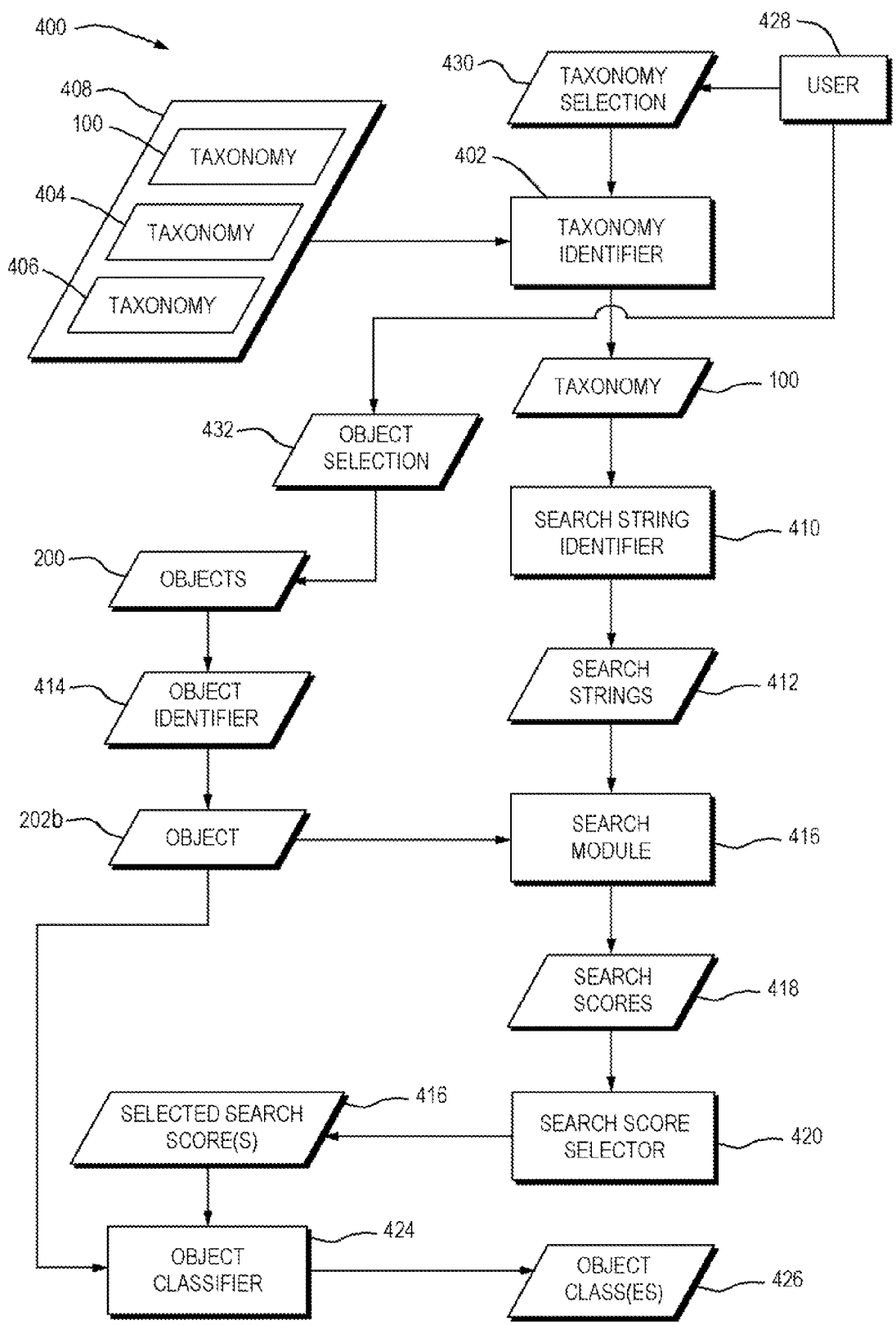
FIG. 4 is a dataflow diagram of a system for performing the method of FIG. 3 according to one embodiment of the present invention.

Examples of techniques will now be described for classifying an object in the taxonomy 100, i.e., for identifying one or more classes to associate with the object. Referring to FIG. 3, a flowchart is shown of a method 300 for classifying an object (such as a document) in the taxonomy 100 according to one embodiment of the present invention. Referring to FIG. 4, a dataflow diagram is shown of a system 400 for performing the method 300 according to one embodiment of the present invention.

The system 402 includes a taxonomy identifier 402, which identifies the taxonomy 100 into which objects 202a-f are to be classified (step 302). For example, the system 400 of FIG. 4 includes a set 408 of multiple taxonomies, including the taxonomy 100 of FIG. 1 and two additional taxonomies 404 and 406. The taxonomy identifier 402 selects one of these taxonomies 408 in which to classify the objects 200.

The taxonomy identifier 402 may perform taxonomy selection in any manner. For example, a user 428 may provide input 430 to the taxonomy identifier 402 identifying the taxonomy to be selected. Furthermore, multiple taxonomies may effectively be selected by forming a new taxonomy having a new root node whose subnodes are the root nodes of the multiple selected taxonomies. For purposes of simplicity, the following discussion will assume that the taxonomy identifier 402 selects taxonomy 100 for use in the remainder of the method 300.

A search string identifier 410 identifies a set of search strings 412 (i.e., queries) based on the taxonomy 100 selected by the taxonomy identifier 402 (step 304). The search strings 412 may be selected in any of a variety of ways, such as the following. The set of search strings 412 is initialised to a null set (step 306). For each node N in the selected taxonomy 100 (step 308), two sets of search strings may be constructed: one by tracing the taxonomic branch from the root node 102 to node N (step 310), and one by tracing the taxonomic branch from node N to the root node 102 (step 312).

In each of steps 310 and 312, the set of search strings corresponding to a taxonomic branch may be constructed as the set of all possible concatenations of class keywords encountered while traversing the branch, selecting exactly one class keyword at each node along the path.

Consider, for example, the case in which node N is node 116 in the taxonomy 100. The taxonomic branch from the root node 102 to node 116 includes nodes 102, 104, 108, and 116. Tracing the taxonomic branch from the root node 102 to node 116 (step 310) produces a first set of two search strings: {"animals mammals felines domestic cats", "animals mammals cats domestic cats"}. Tracing the taxonomic branch from node 116 to the root node 102 (step 312) produces a second set of two search strings: {"domestic cats felines mammals animals", "domestic cats cats mammals animals"}. There are two search strings within each set because there are two class keywords ("felines" and "cats") associated with node 108, but exactly one class keyword associated with all other nodes along the branch.

Within a search string, the class keywords may be delimited to mark each of them as an atomic entity. For example, quotation marts may be placed around each class keyword which consists of multiple words. For example, the search strings above may alternatively be formed as {"animals mammals felines "domestic cats"", "animals mammals cats "domestic cats""} and {""domestic cats" felines mammals animals", ""domestic cats" cats mammals animals"}. Such delimitation need not use quotation marks, but instead may be performed in any appropriate manner.

The class keywords may be concatenated within a search string using appropriate symbols to indicate their logical relations with each other. For example, the first search string indicated above may alternatively be formed as "animals AND mammals AND felines AND "domestic cats"". Such a search string may be translated into the syntax required by the search mechanism (e.g., Internet, search engine) that is used to perform, the search described below.

The Boolean AND operator is used here merely as an example; any symbol(s) representing any logical relations may be used. For example, if the taxonomy 100 specifies particular relations among particular nodes, those particular relations may be used to select the logical operators used in the search string. For example, if the taxonomy 100 specifies that the relationship between a pair of nodes is a necessary relationship, the logical AND operator may be selected to concatenate the keywords corresponding to the pair of nodes in the search string.

If, however, a node defines a set of alternative classifications, then the logical OR operator may be used to concatenate the keywords for the alternatives. For example, consider a taxonomic branch corresponding to the sequence of keywords "Hydrogen," "Technologies," "H2 Storage," "Organic Hydrides," and "Napthalin/Decalin," where the final subclass alternatively contains documents related to Napthalin or Decalin. In this case, the two alternative terms within this class label may be joined by a Boolean OR operator, as in "Napthalin OR Decalin."

Note that the example just described resulted in two sets of two search strings each. The search strings within each set may be ordered or unordered. For example, if the class keywords for a particular class are ordered, the search strings may be ordered according to the order of the class keywords they contain. For example, if the class keywords associated with node 108 are ordered in the sequence "felines" followed by "cats", then the first set of search strings described above may be ordered as {"animals mammals felines "domestic cats""", "animals mammals cats "domestic cats""} to reflect the ordering of the class keywords associated with node 108.

Once the sets of search strings for node 21 have been selected (steps 310-312), those search strings are added to the running list of search strings 412 (step 314). Steps 310-314 are repeated for the remaining nodes in the taxonomy 100 (step 316), thereby populating the set of search strings 412 with search strings corresponding to all of the nodes in the taxonomy 100. Each search string in the set of search strings 412 may be associated with the node to which it corresponds, so that the correspondence may be identified later in the process 300.

Recall that it is desired to classify one or more of the objects 200 (FIG. 2) according to the taxonomy 100. As will now be described in more detail, such classification may be performed by performing searches on the objects to be classified using one or more of the search strings 412.

An object identifier 414 identifies one of the objects 200 to be classified according to the taxonomy 100 (step 318). For purposes of example, in FIG. 4 the object identifier 414 identifies object 202b. The object identifier 414 may, however, identify any one or more of the objects 200. If the object identifier 414 identifies more than one object, then the steps described below with respect to classification of object 202b may be repeated for the other identified objects.

The object identifier 414 may select the object(s) to be classified in any manner. For example, the user may provide input 432 to the object identifier 414 specifying the object(s) to be identified. As another example, the object identifier 414 may identify all of the objects 200.

Consider an example in which the object 202b to be classified in the taxonomy 100 is a document. The system 400 includes a search module 416, such as a search engine, which performs one or more searches on the object 202b using the search strings 412 (step 320). In other words, for each of the search strings 412 that is selected, the search module 416 queries the object 202b with the search string.

The subset of the search strings 412 to be applied by the search module 416 may be selected in any manner. For example, the search module 416 may apply all of the search strings 412. In practice, however, using all of the search strings 412 may consume a prohibitive amount of computational resources. As a result, searches may be performed using fewer than all of the search strings 412. The subset may be selected, for example, either by first using the search string identifier 410 to identify all possible search strings and then selecting a subset of them, or by using the search string identifier 410 to identify only the subset of all possible search strings at the outset, in which case the search module 416 may apply all of the search strings 412.

As yet another example, rankings may be assigned to the search strings 412, and only the most highly-ranked ones of the search strings 412 may be used to search the object 200. Such rankings may be based, for example, on the class keywords contained within the search strings. Recall, for example, that node 108 may be associated with the class keywords "felines" and "cats," and that the keyword "felines" may be preferred over (i.e., have a higher value than) "cats".

As a result, a search string containing the keyword "felines" may be assigned a higher ranking than a search string containing the word "cats." Any formula or algorithm may be used to assign rankings to the search strings 412.

The most highly-ranked search strings may, for example, be defined as a particular predetermined number (e.g., ten) of search strings having the highest rankings or, for example, all search strings having rankings exceeding some predetermined threshold value.

The search module 416 produces a set of search scores 418 based on the searches it performs (step 322). Each of the search scores corresponds to one of the search strings applied by the search module 416. The search score for a particular search string represents the relevance of the search to the object 202b. The search score may, for example, be a single number.

The system 400 includes a search score selector 420 which selects one or more of the highest search scores 422 (step 324). For example, the single highest search score may be selected. The highest score may, for example, be interpreted (after normalization to unity) as the probability that the object 202b (e.g., document) under consideration would be correctly classified under the class corresponding to the highest search score.

The system 400 includes an object classifier 424, which identifies one or more classes 426 into which the object 202b should be classified based on the selected search score(s) 122 (step 326). Recall that each of the search strings 412 may be associated with a particular taxonomic branch, terminating in a particular node (such as a leaf node). Furthermore, each of the selected search scores 422 is associated with the search string 412 which produced the score. The object classifier 424 may therefore identify the object class(es) in which to assign the object 202b by identifying the terminal node(s) of the taxonomic branch(es) associated with the selected (e.g., highest) search score(s) and selecting the class(es) associated with the identified terminal node(s) as the class(es) in which to classify the object 202b. Alternatively, for example, the object classifier 424 may associate the object 202b with nodes other than terminal nodes in the corresponding taxonomic branches.

Although in the method 300 just described the object class 426 is selected automatically by the object classifier 414, this is not a requirement of the present invention. Rather, for example, the system 400 may present the user 428 with a list of the most likely classes (e.g., the classes corresponding to the selected search score(s) 422). The user 428 may use the presented set of classifications as a starting point, select one or more of those classifications as the classification(s) for the object 202b, and provide input to the system 400 indicating the selected classification(s). The system 400 may classify objects more efficiently and accurately than existing systems even when user input is utilized, because the system 400 may limit the number of choices provided to the user 428 to a small number of classes having the highest likelihood of being correct.

The classification techniques disclosed herein may be used for a variety of purposes. For example, as described above, one of the keywords for each class may be selected as a label for the class. The class label may be displayed to the user 428 to represent the class. Initially, a keyword may be selected arbitrarily from among all class keywords as a label for the class. The use of all possible combinations of class keywords as search strings, however, makes it possible to collect statistics about which class keyword yields the best average search score and therefore is most suitable for use as a class label.

Figure 5:
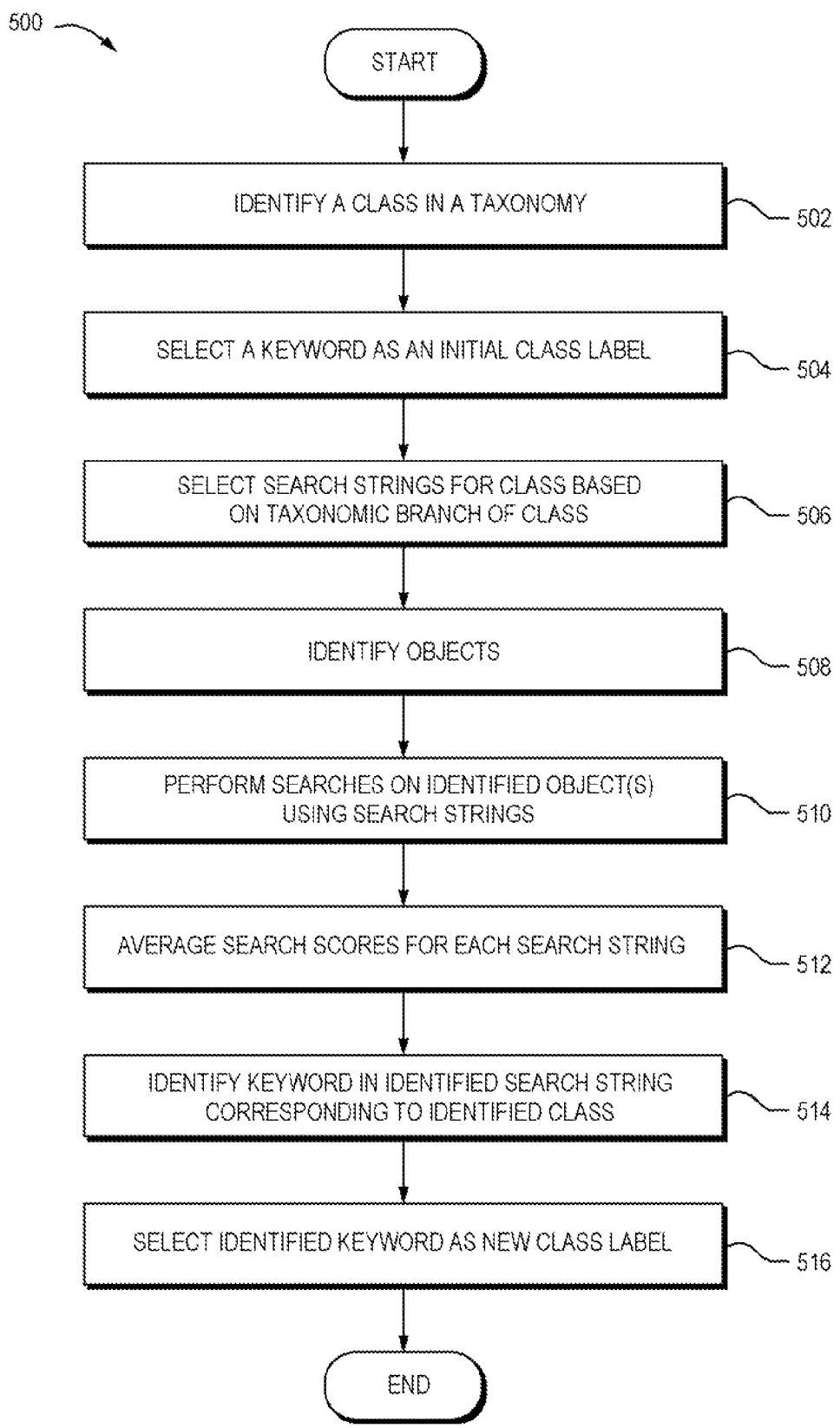
FIG. 5 is a flowchart of a method for selecting a class label for a class in a taxonomy according to one embodiment of the present invention.

Referring to FIG. 5, a flowchart is shown of a method 500 that may be used to select a class label for a class. A class C in a taxonomy is identified (step 502). A class keyword, from among a plurality of class keywords associated with class C, is selected as an initial label for class C (step 504). A plurality of search strings is selected for class C based on the taxonomic branch of class C, using the techniques described above with respect to step 304 of FIG. 3 (step 504).

A plurality of objects is identified (step 506). The objects may, for example, be objects to be classified or already classified by the method 300 of FIG. 3, or objects (such as a document corpus) selected specifically for use in the class label optimization method 500 of FIG. 5. The method 500 performs searches on the identified objects using the identified search strings as queries, thereby producing search scores corresponding to the search strings (step 508).

For each search string, the scores corresponding to the search string are averaged to produce an average score for the search string (step 510). More generally, any function may be applied to the search scores to produce an aggregate search score for each search string. The search string having the highest aggregate (e.g., average) search score is identified (step 512).

The keyword corresponding to class C in the best scoring search string is identified (step 514). The identified keyword is selected as a new label for class C (step 516). Note that although the class label optimization method 500 illustrated in FIG. 5 is described herein as a standalone process, the same function may be integrated with other processes, such as the classification process 300 of FIG. 3. As search scores are obtained for search strings incorporating different class keywords for a given class, the elements of the method 500 of FIG. 5 may be applied to those search scores to select more suitable labels for the class.

Another application of the classification method 300 of FIG. 3 is the automation creation of user profiles according to an existing taxonomy. For example, referring to FIG. 6, a flowchart is shown of a method 600 for creating a user profile according to one embodiment of the present invention. A document corpus associated with the user 428 is identified (step 602). The document corpus may, for example, be a document corpus containing documents authored by the user 428, read by the user 428, and/or downloaded by the user 428. The classification method 300 of FIG. 3 is applied to the document corpus, thereby identifying a set of classes associated with the documents in the corpus (step 604). The classes that result from the method 300 may be stored and used as a profile of the user 428 (step 606).

If the document corpus consists of documents authored by the user 428, then the profile may be considered an "expert profile" of the user 428. If the document corpus consists of documents read and/or downloaded by the user 428, then the profile may be considered a "profile of interest" of the user 428. These are merely examples of ways in which the user profile may be considered.

Figure 6:
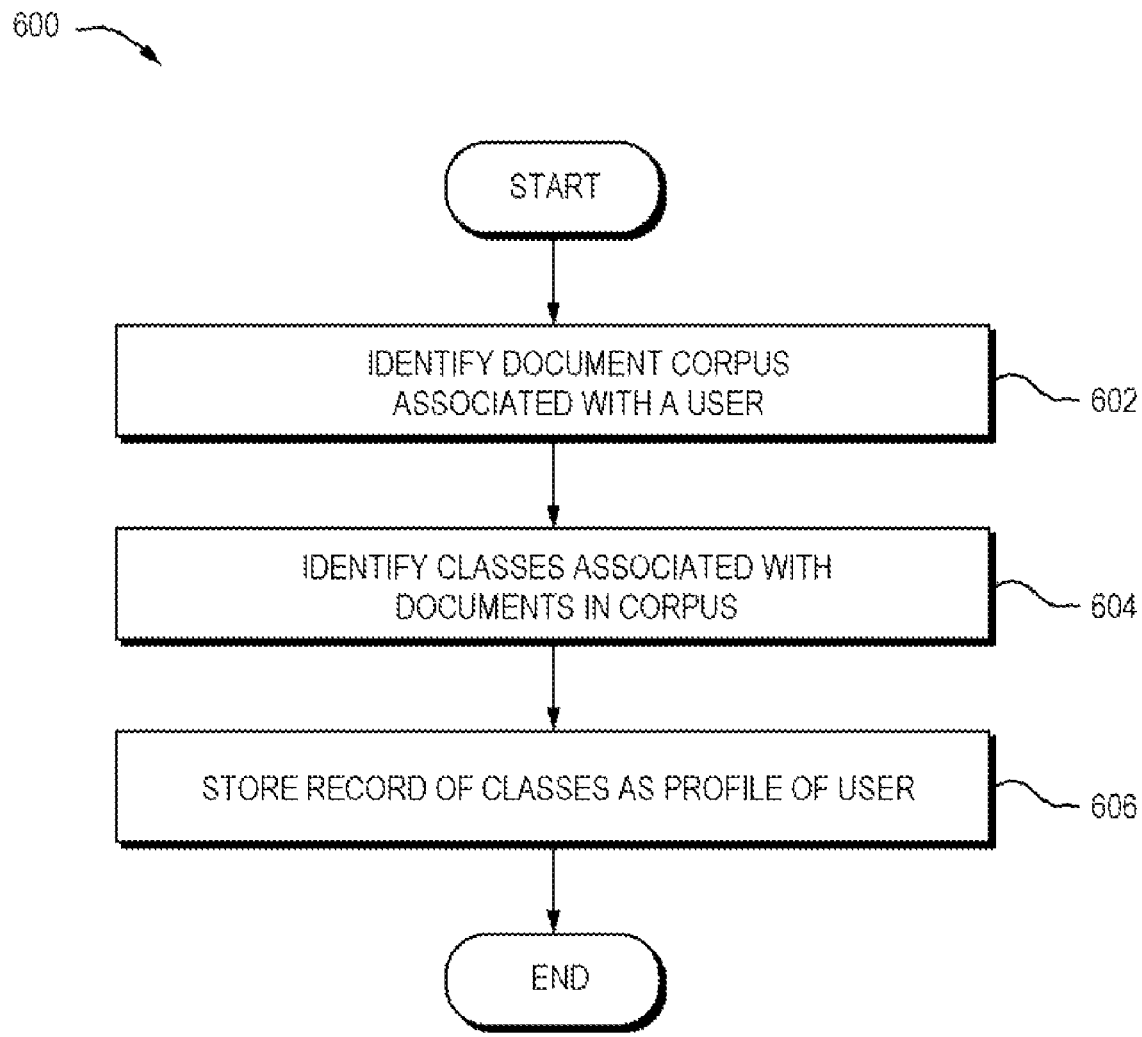
FIG. 6 is a flowchart of a method for creating a user profile according to one embodiment of the present invention.

Once objects have been classified according to the method 300 of FIG. 3 and a user profile has been obtained for the user 428 according to the method 600 of FIG. 6, documents may be associated with the user 428 based on the document classifications and the user profile. For example, referring to FIG. 7, a flowchart is shown of a method 700 for associating documents with the user 428 according to one embodiment of the present invention.

A document corpus is classified using the method 300 of FIG. 3 (step 702). A profile of the user 428 is obtained using the method 600 of FIG. 6 (step 704). Documents having classifications which sufficiently match the user profile are identified (step 706). Any measure of "sufficient" matching may be used. For example, a particular document may be deemed to match the user profile sufficiently if at least some minimum number of classes associated with the document match classes in the user profile. Alternatively, for example, some percentage of classes in the document classification (e.g., the set of object classes 426 in FIG. 4) and the user profile may be required to match. Any matching documents may be associated with the user 428 (step 708). Such documents may, for example, be sent automatically to the user 428 (e.g., by email) or stored in a user account for subsequent viewing by the user 428.

Documents having matching classifications may be identified in step 706 in any of a variety of ways. For example, if documents in the document corpus have already been classified according to the taxonomy associated with the user profile obtained in step 704, then the classes associated with the documents in the document corpus may be compared to the classes associated with the user profile to determine which documents in the corpus have classifications that sufficiently match the user profile. If, however, documents in the document corpus have not been classified according to a taxonomy, or if the documents in the document corpus have not been classified according to the same taxonomy as the user profile, then matching documents may be identified by performing searches on the document corpus using search strings derived from the user profile. Documents which score sufficiently highly in the search results may foe considered to match the user profile. In this way, documents in the document corpus may be classified within the user profile without the need to pre-classify the documents under the taxonomy associated with the user profile.

The method 700 may be performed in various contexts. For example, the user 428 may select a particular database as the document corpus and then run the method 700 on the selected corpus to obtain documents of interest. As another example, the document corpus may instead be a document feed, such as an RSS feed, or be linked to an email account (or other type of account) to receive incoming email. The method 700 may be applied to incoming documents on the feed to identify documents of potential interest to the user 428. In other words, the document corpus may be dynamic, and the classification, matching, and association steps 704-708 may be performed as new documents are added to the corpus (e.g., received on the feed). A corporation or other enterprise may run the method 700 on a server for a plurality of users, thereby enabling incoming documents to be routed only to those users to whom the documents are likely to be of interest.

As an example of yet another application of the classification method 300, the user 428 need not be limited to obtaining documents based on a profile of the user 428. Consider, for example, the method 800 of FIG. 8. As in the method 700 of FIG. 7, a document corpus is classified according to a taxonomy using the method 300 of FIG. 3 (step 802). In this case, however, the user 428 specifies a particular taxonomy to be applied against the document corpus (step 804).

Figure 7:
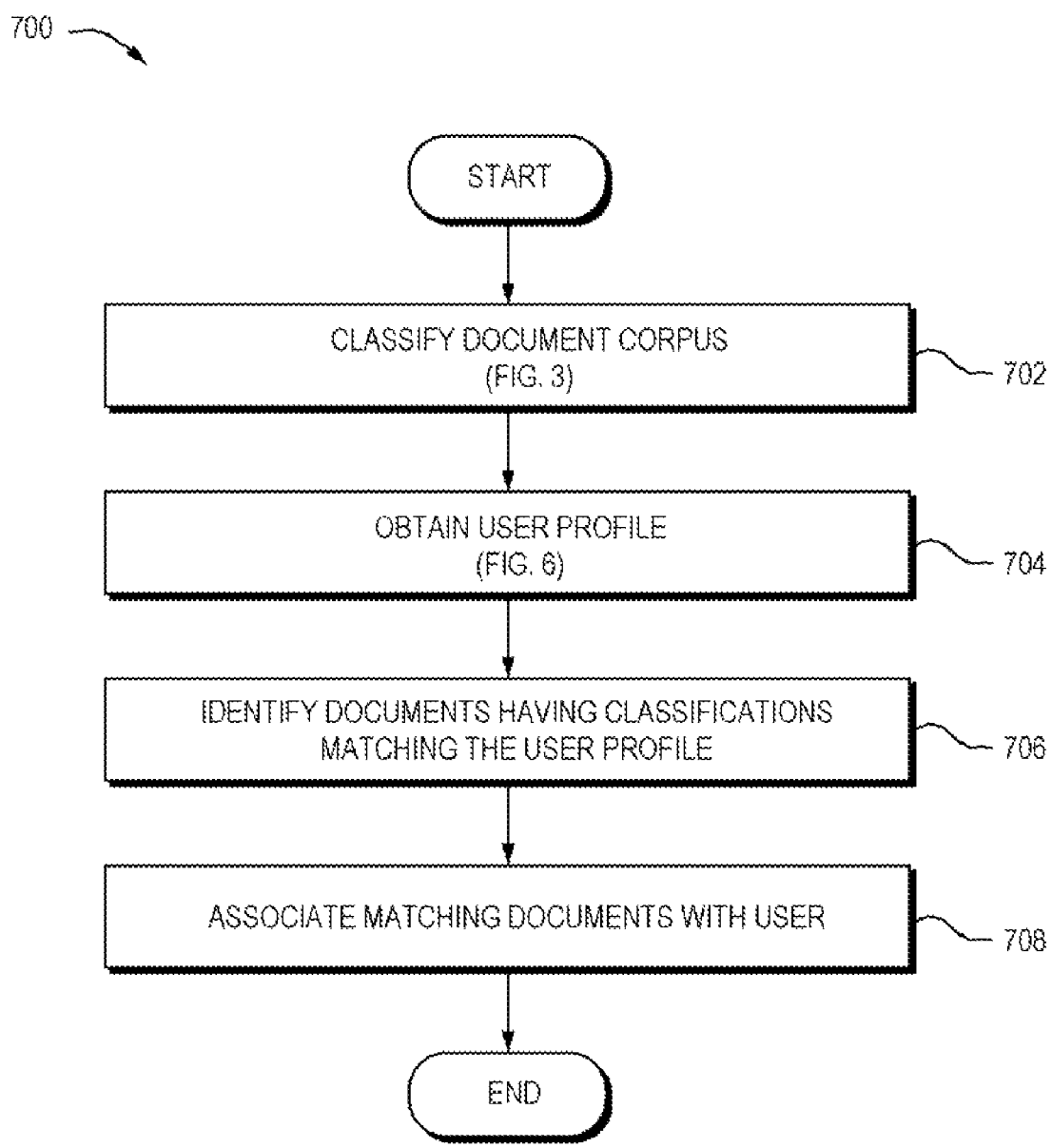
FIG. 7 is a flowchart of a method for associating documents with a user based on a profile of the user according to one embodiment of the present invention.

Documents having classifications which sufficiently match the user-specified taxonomy are identified (step 806), such as in the manner described above with respect to step 706 of the method 700 of FIG. 7. Any matching documents may be associated with the user 428 (step 808), such as in any of the ways described above with respect to step 708 of the method 700 of FIG. 7.

Figure 8:
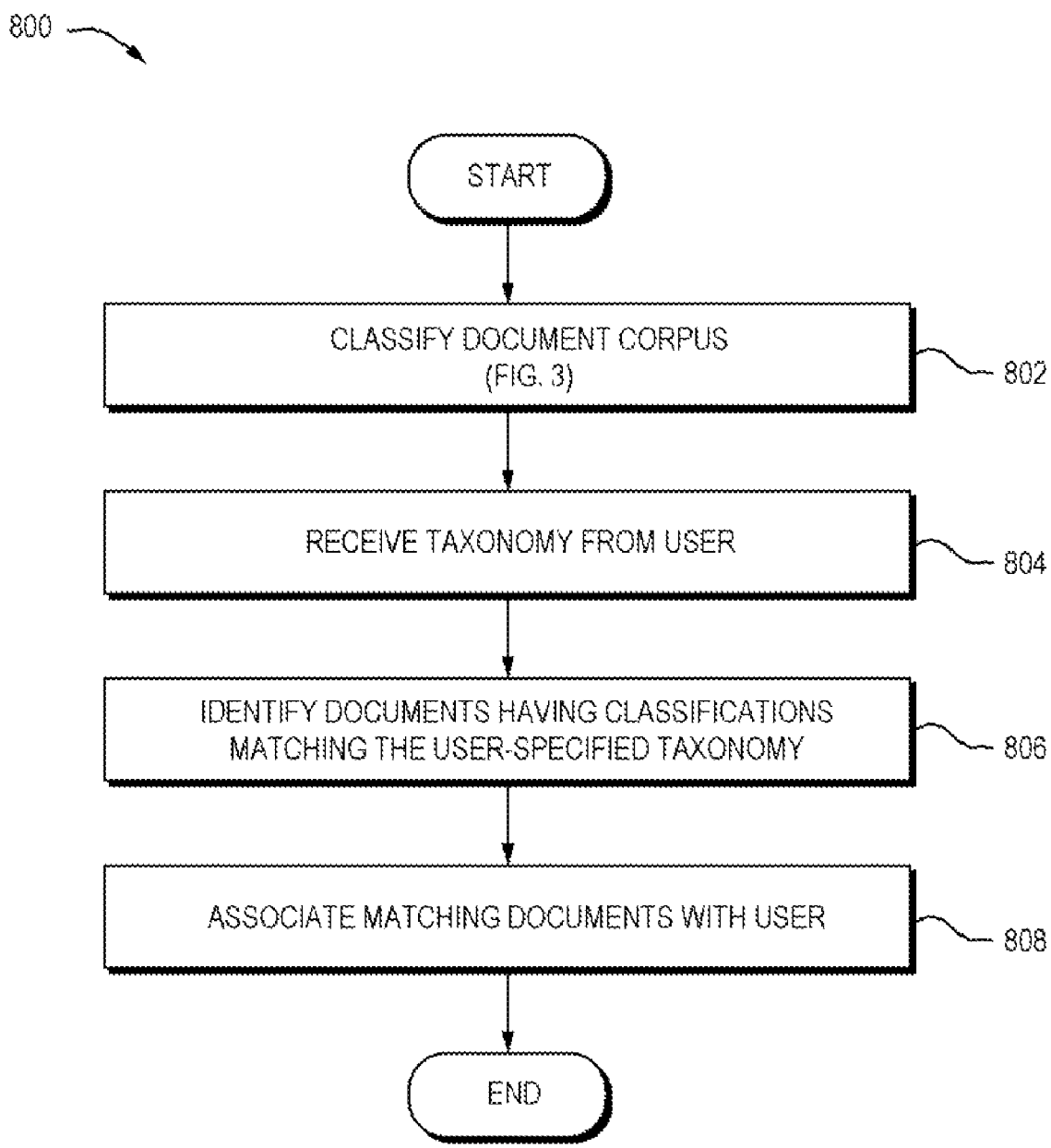
FIG. 8 is a flowchart of a method for associating documents with a user based on a user-specified taxonomy according to one embodiment of the present invention.

The method 800 of FIG. 8 effectively enables the user 428 to use a taxonomy as a query against a document corpus. Such a method could be particularly useful, for example, to deliver market intelligence on an ongoing basis if combined with a function for alerting the user 428 to new documents that match the specified taxonomy.

The user 428 may be provided with a convenient user interface for specifying the search taxonomy in step 804. For example, a comprehensive taxonomy may be displayed to the user 428 in an expandable/collapsible tree structure. The user 428 may use a graphical user interface (GUI) to navigate the tree structure and select nodes of interest. The selected nodes, and their interrelationships, may be extracted from the comprehensive taxonomy to form the user-specified taxonomy in step 806.

Figure 9:
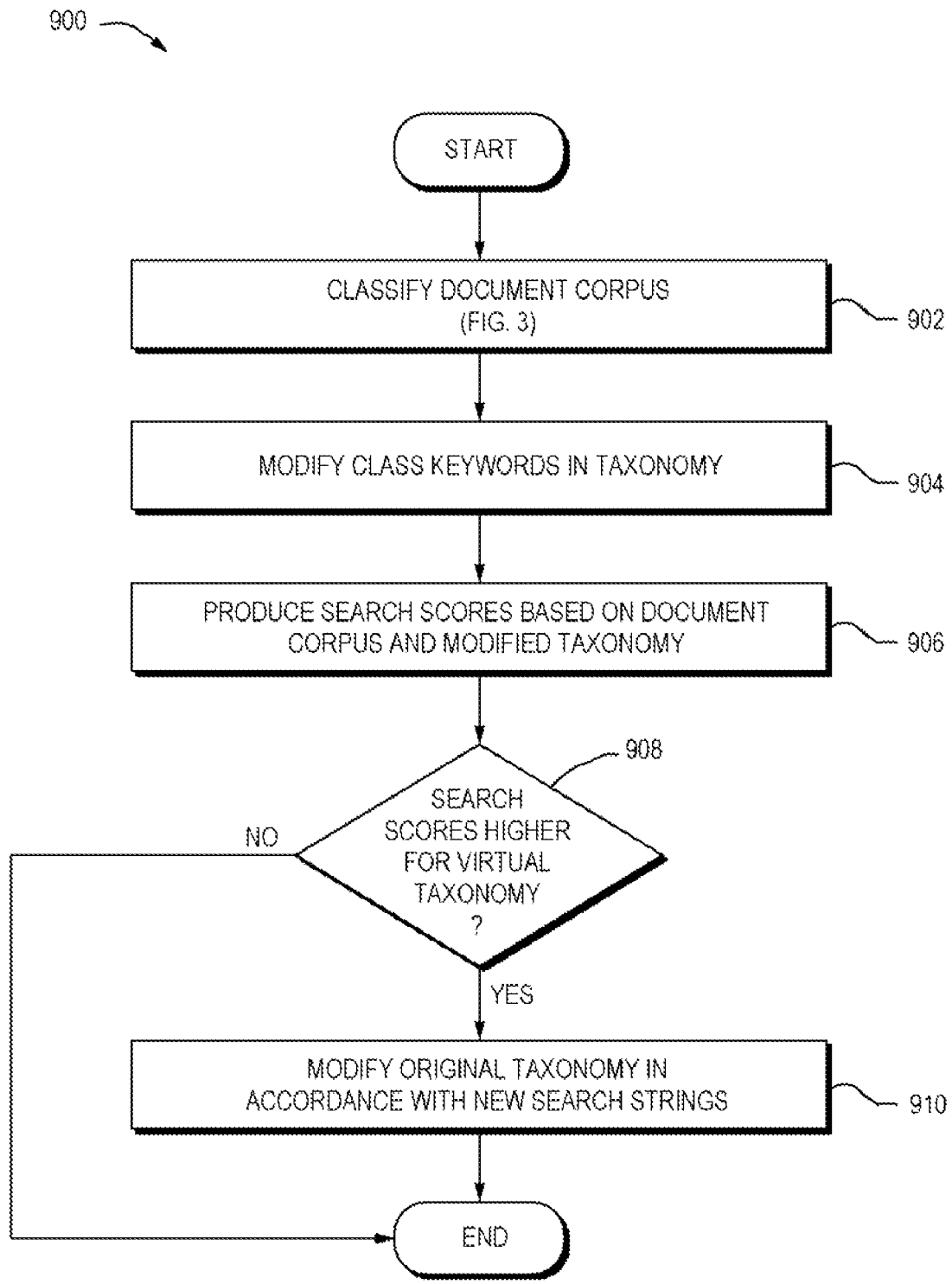
FIG. 9 is a flowchart of a method for optimizing a taxonomy according to one embodiment of the present invention.

Once a document corpus has been classified according to a taxonomy, the taxonomy may be optimized based on the document corpus. Consider, for example, the method 900 of FIG. 9. A document corpus is classified according to a taxonomy using the method 300 of FIG. 3 (step 902). Modifications are made to class keywords associated with nodes of the taxonomy, such as by adding, deleting, or re-ordering class keywords associated with nodes of the taxonomy (step 904). This produces a modified version of the original taxonomy, referred to herein as a "virtual taxonomy."

The document corpus is classified according to the virtual taxonomy (step 906), thereby producing new search scores which reflect the modifications made to the original taxonomy. The method 900 determines whether any particular search strings associated with the virtual taxonomy reliably produced higher search scores than the search strings associated with the same nodes in the original taxonomy (step 908). For any such search strings which are identified, the method 900 modifies the original taxonomy based on the nodes in the virtual taxonomy which correspond to the search strings that reliably produced higher search scores (step 910). For example, if omitting a class keyword from the search strings caused reliably higher search scores, then the original taxonomy may be modified by deleting the corresponding class from the original taxonomy, the pertaining objects being reclassified accordingly.

Alternatively, for example, the taxonomy structure may remain unchanged, but the keywords in the original taxonomy may be modified based on the search strings that reliably produced higher search scores. For example, if omitting a class keyword from the search strings caused reliably higher search scores, then the class keyword may be removed from the list of class keywords for its class.

As yet another alternative, both the taxonomy structure and class keywords may be optimized by applying both of the techniques just described. As with the other methods disclosed herein, this method 900 may be performed as a post-process to an existing document corpus, on-the-fly to a dynamic document corpus as it evolves, or any combination thereof.

Figure 10:
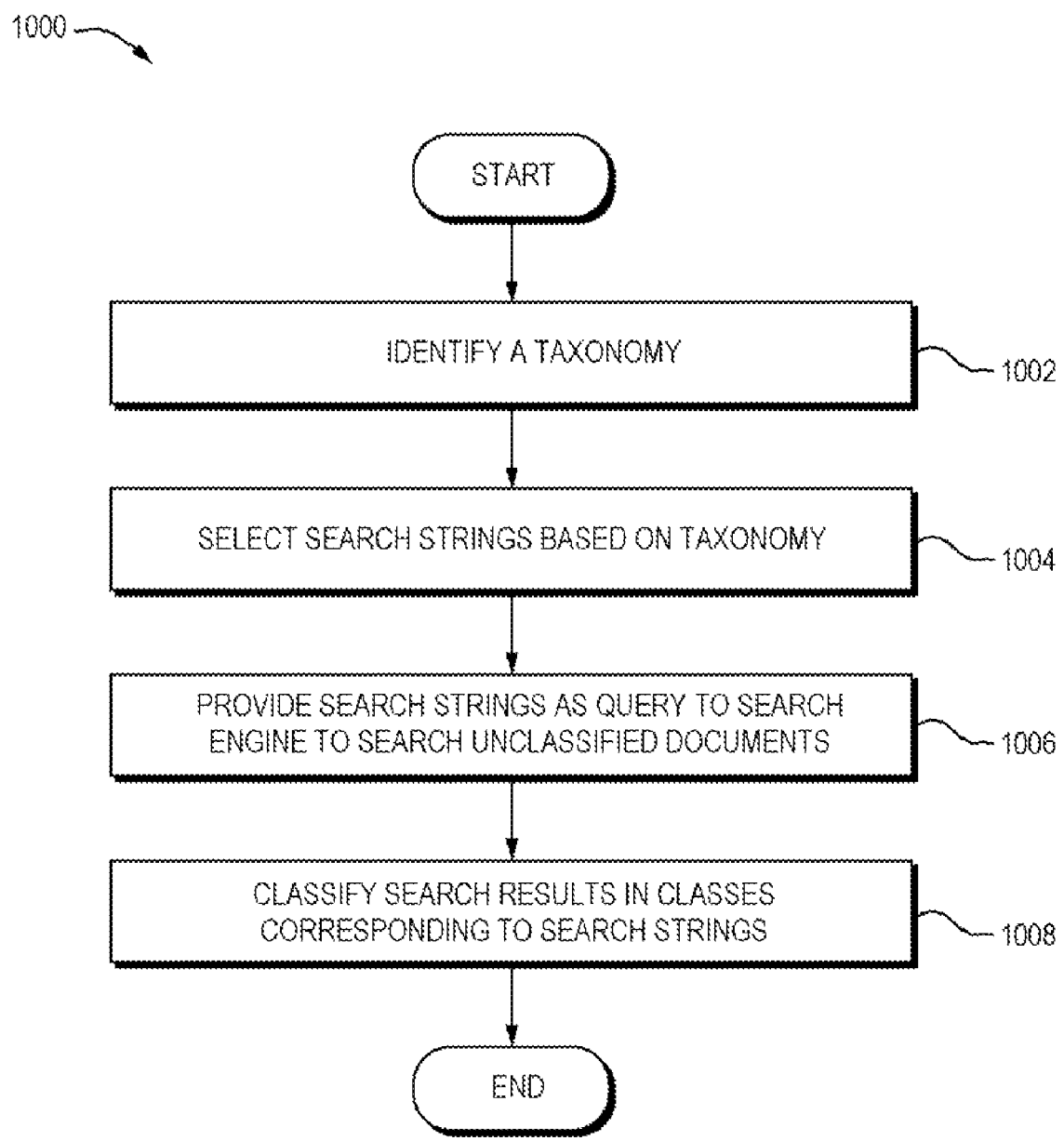
FIG. 10 is a flowchart of a method for classifying unclassified public documents using a private taxonomy according to one embodiment of the present invention.

As yet another example of an application of the classification method 300, consider the method 1000 of FIG. 10. The method 1000 identifies an existing taxonomy (step 302). The taxonomy may, for example, be a private locally-stored taxonomy developed by the user 428. The method 1000 selects search strings based on the taxonomy, such as by using the techniques disclosed above with respect to step 304 of FIG. 3 (step 1004).

The method 1000 provides the search strings as queries to a search engine to perform searches on unclassified documents (step 1006). The search engine may, for example, be a remotely-located public Internet search engine for searching web-based documents.

For each search string, the search results (e.g., web pages or other web-based documents) resulting from the search performed using the search string may be "virtually" classified in the class corresponding to the search string (step 1008). In this way, the method 1000 provides a way to classify previously-unclassified documents in remote repositories according to the taxonomy. The method 100 may even be used to classify documents located in remote repositories according to a local taxonomy without the need to incorporate the documents into a local content repository.

Embodiments of the present invention have a variety of advantages. For example, embodiments of the present invention enable objects, such as documents, to be classified reliably and efficiently based only on information contained in the structure of the taxonomy 100. In particular, the search strings 412 may be formed solely using class keywords associated with the taxonomy 100, and without using information about relationships among the objects 200 to be classified. As a result, the search module 416 of FIG. 4 may be implemented using widely-available, off-the-shelf, inexpensive (or free), efficient, and reliable search engines.

Embodiments of the present invention are also flexible. They may be applied generally to classify objects 200, such as documents, without prior knowledge of the contents, structure, or interrelationships among the objects 200. Furthermore, the techniques disclosed herein may be used in conjunction with any taxonomy, so long as the taxonomy is associated with class keywords in the manner described herein. As a result, the techniques disclosed herein may be applied effectively to a wide variety of taxonomies and objects with little or no customization.

Another advantage of embodiments of the present invention is that they may be used to classify objects based on a taxonomy even when there is no existing object corpus which has been classified according to the taxonomy. In other words, the techniques disclosed herein may be used to perform classification based solely on a taxonomy and the objects to be classified. In comparison to systems which require an existing object corpus to be classified according to the taxonomy before additional objects may be classified, the techniques disclosed herein provide greater flexibility and reduce the resources required to be expended before classification may be performed. In particular, the techniques disclosed herein may perform classification using standard "off-the-shelf" taxonomies, even in the absence of an existing corpus of content on which to base a classification. Because classification is performed based on the taxonomy, the techniques disclosed herein may easily and quickly switch between, and even superimpose, the taxonomies that are used for classification.

As described above, the techniques disclosed herein may be used to formulate search strings based on the taxonomic branch connecting a node to the root node of the taxonomy. In this way, the hierarchical structure of the taxonomic branch corresponding to a particular class is linearized into a form that is suitable for input to a standard search engine. The techniques disclosed herein, therefore, advantageously enable standard search engines to be used to perform searches for hierarchical content, even though such search engines cannot be used to search for such content in its original form. The techniques disclosed herein, in other words, may be used to leverage the power and widespread availability of search engines to assist in object classification, a task which search engines were not designed to perform.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although particular examples of taxonomies are disclosed herein, embodiments of the present invention are not limited to use with those taxonomies. For example, embodiments of the present invention are not limited to use in conjunction with the taxonomy 100 of FIG. 1, or to taxonomies having the same or similar data or structure as the taxonomy 100 of FIG. 1.

Although in the examples described above the search strings are constructed by tracing the full taxonomic branch from the root node to node N and vice versa, this is not a requirement of the present invention. For example, if a keyword (e.g., label) for a subclass already contains a keyword (e.g., label) of a superclass, the same keyword need not be duplicated within the corresponding search string. For example, if a taxonomic branch has the sequence of keywords "Hydrogen," "Technologies," "Storage," and "Storage Strategy," then the label "Storage" may be omitted from the search string which tests for classification into the "Storage Strategy" class, since "Storage" is already contained in "Storage Strategy" and therefore does not contribute any new information.

As another example, keywords for all nodes in a particular taxonomic branch need not be included in the search string if the taxonomy is very general and has a large number of levels, while the corresponding objects (e.g., documents) are very specific in their content. In this case, it is unlikely that the taxonomy terms near the root node will appear in the document. In such a case it may be more efficient to start constructing the search string from the leaf node upwards towards the root node, yet stopping before the root node itself is reached.

Before performing the method 300, the class keywords for a given class may be sorted by frequency or popularity of use, such that earlier entries in the list of keywords for the class are more likely to result in a higher search score than later entries. Assume, for example, that some set of objects has already been classified within the taxonomy 100. In that case, the frequency of use of class keywords for a given class may be identified by, for example, using the search module 416 to perform searches using all possible search strings for the class over the objects (e.g., documents) already classified within the class, and then sorting the keywords according to the resulting search scores. As another example, the frequency of use of class keywords for a given class may be identified by providing all possible search strings to an Internet search engine and ranking the keywords according to the scores resulting from such searches.

Although in the examples described above the search module 416 performs searches using all of the search strings 412, this is not a requirement of the present invention. For example, to increase efficiency, the searches performed by the search module 416 may be split into multiple runs. For example, in each run only one search string per class may be applied. In the first run, for example, only the highest-ranking search string for each class may be used. If the rankings were generated based on the average frequency of use of class keywords in the documents, then the first run should already produce useful results.

The results of the searches performed by the search module 416 in the first run may be evaluated. If the evaluation of the first run indicates that its results are sufficiently useful, then the search module 416 may terminate after the first run. If not, the search module 416 may perform a second run using the next most highly-ranked search strings for each class, and the results again evaluated for usefulness. This technique limits the number of searches that need to be performed to the number necessary to produce useful results, and thereby limits the computational resources required to be utilized by the search module 416.

The term "search engine" as used herein, may refer to any apparatus and/or software that performs searches. The term "search engine," as used herein, is not limited to search engines accessible over the Internet or to search engines for searching Web content. The search module 416 may, for example, include or otherwise have access to and make use of a search engine to perform searches. Those having ordinary skill in the art will appreciate how to use search engines to perform the functions disclosed herein.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Those having ordinary skill will understand how to implement any component of the system 400 using appropriate program code. For example, any of the data structures of the system 400 may contain data values by incorporation (copying) or by reference (pointers). Therefore, any references herein to a data structure "containing" or "including" particular data should be understood to encompass implementations in which the data structure refers to the data.

Each computer program within the scope of the claims below may be implemented in any programming language, such as machine language, assembly language, a high-level procedural programming language, a functional programming language, a logic programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for classifying an object in a taxonomy, the taxonomy including a plurality of nodes associated with a plurality of classes, the object being external to the taxonomy, the method comprising:
   (A) identifying a plurality of search strings based on a first plurality of class keywords associated with the plurality of nodes, wherein identifying comprises, for at least one particular node N in the plurality of nodes:
      (A)(1) traversing a first branch in the taxonomy linking a root node of the taxonomy to node N; and
      (A)(2) for each node M in the first branch, selecting a class keyword associated with node M and adding the selected class keyword to a first one of the plurality of search strings associated with node N, whereby the first one of the plurality of search strings contains a second plurality of class keywords;
   (B) using a search engine to perform a plurality of searches on the object using the plurality of search strings to produce a plurality of search scores corresponding to the plurality of search strings;
   (C) identifying one of the plurality of nodes based on the plurality of search scores; and
   (D) classifying the object in a class associated with the identified node.

2. The method of claim 1, wherein (A) further comprises:
   (A)(3) traversing a second branch in the taxonomy linking node N to the root node of the taxonomy; and
   (A)(4) for each node L in the second branch, selecting a class keyword associated with node L and adding the selected class keyword to a second one of the plurality of search strings associated with node N.

3. The method of claim 1, wherein (A) further comprises delimiting each of the second plurality of class keywords in the first one of the plurality of search strings to mark each of the second plurality of class keywords in the first one of the plurality of search strings as an atomic entity.

4. The method of claim 1, wherein (A) further comprises concatenating the second plurality of class keywords in the first one of the plurality of search strings with symbols indicating logical relationships of the second plurality of class keywords in the first one of the plurality of search strings to each other.

5. The method of claim 1, wherein a third plurality of class keywords having an order is associated with node M, and wherein (A)(2) comprises selecting the class keyword based on the order of the third plurality of class keywords associated with node M.

6. The method of claim 1, wherein (C) comprises:
   (C)(1) identifying one of the plurality of search scores having a maximum value among the plurality of search scores;
   (C)(2) identifying one of the plurality of search strings that produced the search score having the maximum value; and
   (C)(3) identifying one of the plurality of nodes associated with a plurality of class keywords on which the identified one of the plurality of search strings was based.

7. The method of claim 1, wherein (D) comprises:
   (D)(1) identifying a class among the plurality of classes associated with the identified one of the plurality of nodes; and
   (D)(2) classifying the object in the identified class.

8. The method of claim 1, wherein the object comprises a document.

9. The method of claim 1, wherein (A) further comprises:
   (A)(3) identifying a first plurality of search strings based on the first plurality of class keywords associated with the plurality of nodes;
   (A)(4) identifying a plurality of rankings of the first plurality of search strings; and
   (A)(5) identifying a subset of the first plurality of search strings based on the plurality of rankings; and
   wherein (B) comprises performing the plurality of searches on the object using the subset of the first plurality of search strings to produce the plurality of search scores.

10. The method of claim 1, wherein (C) comprises:
    (C)(1) providing a user with an indication of a plurality of nodes corresponding to a subset of the plurality of search scores; and
    (C)(2) receiving from the user a selection of one of the plurality of nodes corresponding to the subset of the plurality of search scores.

11. A computer program product comprising computer-executable instructions, tangibly stored on a computer readable medium, for execution by a processor to perform a method for classifying an object in a taxonomy, the taxonomy including a plurality of nodes associated with a plurality of classes, the object being external to the taxonomy, the method comprising:
    (A) identifying a first plurality of search strings based on a plurality of class keywords associated with the plurality of nodes, wherein identifying comprises, for at least one particular node N in the plurality of nodes:
       (A)(1) traversing a first branch in the taxonomy linking a root node of the taxonomy to node N; and
       (A)(2) for each node M in the first branch, selecting a class keyword associated with node M and adding the selected class keyword to a first one of the plurality of search strings associated with node N, whereby the first one of the plurality of search strings contains a second plurality of class keywords;
    (B) performing a plurality of searches on the object using the plurality of search strings to produce a plurality of search scores corresponding to the plurality of search strings;
    (C) identifying one of the plurality of nodes based on the plurality of search scores; and
    (D) classifying the object in a class associated with the identified node.

12. The computer program product of claim 11, wherein (A) further comprises:
    (A)(3) traversing a branch in the taxonomy linking node N to the root node of the taxonomy; and
    (A)(4) for each node L in the second branch, selecting a class keyword associated with node L and adding the selected class keyword to a second one of the plurality of search strings associated with node N.

13. The computer program product of claim 11, wherein (A) further comprises delimiting each of the second plurality of class keywords in the first one of the plurality of search strings to mark each of the second plurality of class keywords in the first one of the plurality of search strings as an atomic entity.

14. The computer program product of claim 11, wherein (A) further comprises concatenating the second plurality of class keywords in the first one of the plurality of search strings with symbols indicating logical relationships of the second plurality of class keywords in the first one of the plurality of search strings to each other.

15. The computer program product of claim 11, wherein a third plurality of class keywords having an order is associated with node M, and wherein (A)(2) comprises selecting the class keyword based on the order of the third plurality of class keywords associated with node M.

16. The computer program product of claim 11, wherein (C) comprises:
- (C)(1) identifying one of the plurality of search scores having a maximum value among the plurality of search scores;
- (C)(2) identifying one of the plurality of search strings that produced the search score having the maximum value; and
- (C)(3) identifying one of the plurality of nodes associated with a plurality of class keywords on which the identified one of the plurality of search strings was based.

17. The computer program product of claim 11, wherein (D) comprises:
- (D)(1) identifying a class among the plurality of classes associated with the identified one of the plurality of nodes; and
- (D)(2) classifying the object in the identified class.

18. The computer program product of claim 11, wherein the object comprises a document.

19. The computer program product of claim 11, wherein (A) comprises:
- (A)(3) identifying a first plurality of search strings based on the plurality of class keywords associated with the plurality of nodes;
- (A)(4) identifying a plurality of rankings of the first plurality of search strings; and
- (A)(5) identifying a subset of the first plurality of search strings based on the plurality of rankings; and
- wherein (B) comprises performing the plurality of searches on the object using the subset of the first plurality of search strings to produce the plurality of search scores.

20. The computer program product of claim 11, wherein (C) comprises:
- (C)(1) providing a user with an indication of a plurality of nodes corresponding to a subset of the plurality of search scores; and
- (C)(2) receiving from the user a selection of one of the plurality of nodes corresponding to the subset of the plurality of search scores.

21. The computer program product of claim 11, wherein (B) comprises a search engine.

\* \* \* \* \*